United States Patent [19]

Gehri

[11] Patent Number: 5,581,645
[45] Date of Patent: Dec. 3, 1996

[54] PLUG CONNECTION FOR OPTICAL WAVEGUIDES WHICH PREVENTS UNINTENTIONAL CONTACT

[76] Inventor: Walter A. Gehri, 8712 Stafa, Rainstrasse 22, Switzerland

[21] Appl. No.: 356,288

[22] Filed: Sep. 6, 1994

Related U.S. Application Data

[63] Continuation-in-part of PCT/EP93/00832 Apr. 3, 1993 published as WO94/11767 May 26, 1994.

[30] Foreign Application Priority Data

Nov. 6, 1992 [CH] Switzerland .................. 3450/92

[51] Int. Cl.⁶ .................................................. G02B 6/36
[52] U.S. Cl. .................. 385/78; 385/55; 385/56; 385/59; 385/70; 385/71; 385/77; 385/76
[58] Field of Search ................. 385/53, 54, 55, 385/56, 59, 60, 66, 76, 77, 78, 81, 84, 70, 71, 72, 73, 139

[56] References Cited

U.S. PATENT DOCUMENTS

| | | | |
|---|---|---|---|
| 4,789,218 | 12/1988 | Paul et al. | 385/59 X |
| 4,820,185 | 4/1989 | Moulin | 439/321 |
| 4,852,963 | 8/1989 | Lampert | 385/60 |
| 4,880,291 | 11/1989 | Aberson, Jr. et al. | 385/55 |
| 5,129,023 | 7/1992 | Anderson et al. | 385/70 |
| 5,283,848 | 2/1994 | Abendschein et al. | 385/59 |

*Primary Examiner*—Brian Healy

[57] ABSTRACT

The invention relates to an optical waveguide plug for plug connections between optical waveguides (12). Conventional plugs have the disadvantage that a fitter could make relatively easy, even unintentional contact with the polished end of the optical waveguide (12) in the pin (1) which holds it. According to the invention, a restoring spring (6) which withdraws the pin (1) to a protected position when the plug is in the rest state is provided.

13 Claims, 4 Drawing Sheets

5,581,645

PLUG CONNECTION FOR OPTICAL WAVEGUIDES WHICH PREVENTS UNINTENTIONAL CONTACT

This is a Continuation-In-Part of International Application PCT/EP93/00832, filed Apr. 3, 1993, WO94/11767 May 26, 1994 of the same inventor.

BACKGROUND OF THE INVENTION

1. Field of the Invention

The invention relates to a plug for a plug connection for optical waveguides. Such plug connections are required wherever continuous optical waveguides cannot be provided, that is to say, for example, in the case of couplings between railway cars, etc.

2. Discussion of the Prior Art

FIG. 1 shows examples of known plugs from the prior art such as those used in standard applications. FIG. 1a shows a plug connection in which two pins 1a and 1b are inserted together into a centring coupling sleeve 2a. This state should be achieved in principle in the case of all such plug connections, since the pins 1 are highly accurate guide parts, in the centre of which the thin optical waveguide is held. The polished ends of the particular optical waveguides must as far as possible be centred opposite one another in order to avoid transmission losses during light transmission. It is also important for the pins 1 or the ends of the optical waveguides to approach one another as closely as possible. The last-mentioned condition is well fulfilled by a construction according to FIG. 1c, where at least one pin 1c of a plug connection is spring-loaded in the connecting direction. When two plugs are united, similarly to the position in FIG. 1a, such a pressure spring 3a ensures that the pin 1c is pressed under spring force against the assigned second pin (e.g. 1a), so that the distance between the two pins 1 is minimal.

These known arrangements give rise to a technical problem:

If the plugs or pins 1b or 1c are pulled out of their plug connections, the pins 1 or the ends of the optical waveguides are exposed to the atmosphere since the sleeve 2a remains on the pin 1a in the case of FIG. 1a and since the pressure spring 3a according to FIG. 1c pushes the pin 1c forwards into the position shown. The optical waveguides or the ends thereof are without protection in these positions and can easily be contaminated or damaged by moisture, dust, dirt or body fluids—when the pin 1 is touched with the fingers— which may lead to transmission losses or failures on subsequent reuse of the plugs.

The only known protection against this is the mounting of a cap 4 on the pin 1 (FIG. 1b). However, it is precisely the mounting of this cap that is dangerous since, in the event of a slight lack of attention, the fitter may, for example, slip and, instead of the cap 4, his fingers will touch the end of the pin. Apart from this, the pin 1 is unprotected until the cap 4 has been mounted.

SUMMARY OF THE INVENTION

It is the object of the invention to provide a plug which does not expose the end of the optical waveguide even in the unconnected state, and thus protects it from undesired contact, dust, etc.

This object is achieved by a connector for a plug connection for optical wave guides, having a first plug part, wherein at least the first plug part includes a pin in which the optical wave guide is embedded and a spring which subjects the pin to a spring load relative to the plug housing. The spring is a restoring spring that presses the pin in a direction opposite to movement of the first plug part when the first plug part is moved to a connection position with the second plug part, so that the pin moves to a rest position inside the plug housing the first plug part when the first plug part and the second plug part are in a disconnected position, and the plug housing is of a design such that the pin in the rest position is protected from unintentional contact with a user.

BRIEF DESCRIPTION OF THE DRAWINGS

In addition, the invention relates to further solutions and variants or embodiments, which are evident from the description of the Figures. The description of the Figures relates to embodiments which do not restrict the scope of protection of the claims. The Figures are described in relation to one another; identical parts bear the same reference symbols; different parts bear the same reference symbols with different indices.

DETAILED DESCRIPTION OF PREFERRED EMBODIMENTS

Figure 2:
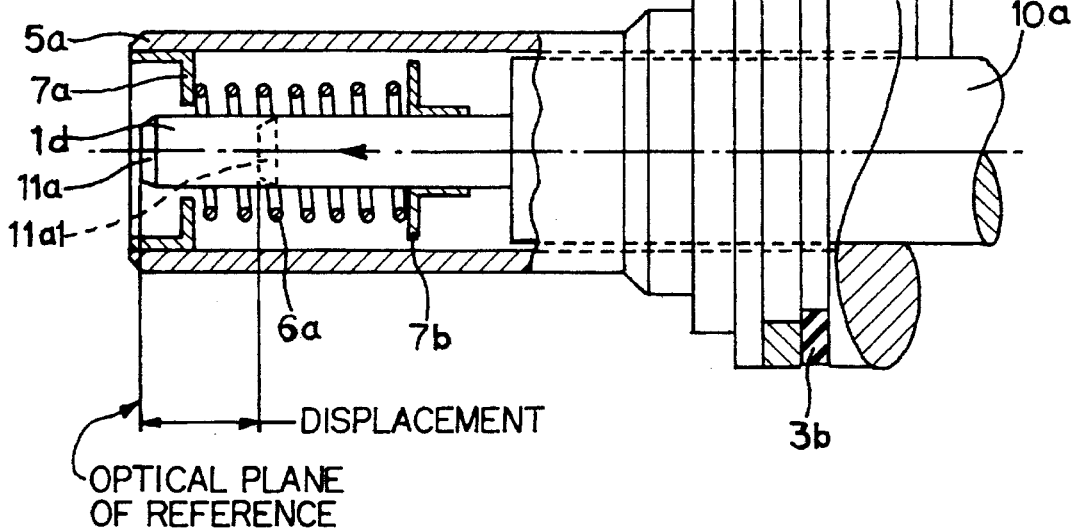
FIG. 2 shows a single-pole plug according to the invention, in the retracted state.

The technical realisation of the invention according to FIG. 2 consists of a conventional pin 1d which can be longitudinally inserted into a plug housing 5a, a restoring spring 6a between supporting sleeves 7a and b and—only schematically indicated—a lock 8a which cooperates at one end with a stop 9a fixed to the housing and is connected at the outer end to a pin 1d or to its base part 10a.

The supporting sleeve 7a is rigidly connected to the inner surface of the cylindrical plug housing 5a, while the supporting sleeve 7b is fixed to the pin 1d. The connections can be made by pressing, screw threads or the like. The restoring spring 6a thus applies pressure to the pin 1d in a direction opposite to the insertion direction, so that, in the unconnected or unlocked state of the plug, the pin end 11a is kept pressed in the protected position 11a1. The position shown is reached by pushing the base part 10a forward in the insertion direction (arrow) against the force of the spring 6a until the lock 8a catches on the stop 9a. The stop 9a is itself annular and is slightly longitudinally displaceable on the plug housing 5a, against the force of a pressure spring 3b. The pressure spring 3b shown schematically consists of a resilient sealing ring having a restoring force greater than the restoring force of the restoring spring 6a. The principle of the invention also functions without a pressure spring 3, but a variant having one is preferred since the criterion of good contact between the pins 1 in the connected state is then better fulfilled. With normal plug adjustment, the ends 11 of the pin 1 are located so that they would overlap when connected. This theoretical overlap is compensated by the spring-loaded mobility of the stop 9a and with it the lock 8a and the base element 10a.

When a plug connection is disconnected, the fitter first opens the lock 8a, after which the pin 1d jumps to the position 11a1 and hence reaches a protected position, after which the plug connection can be completely opened without any danger.

Figure 3:
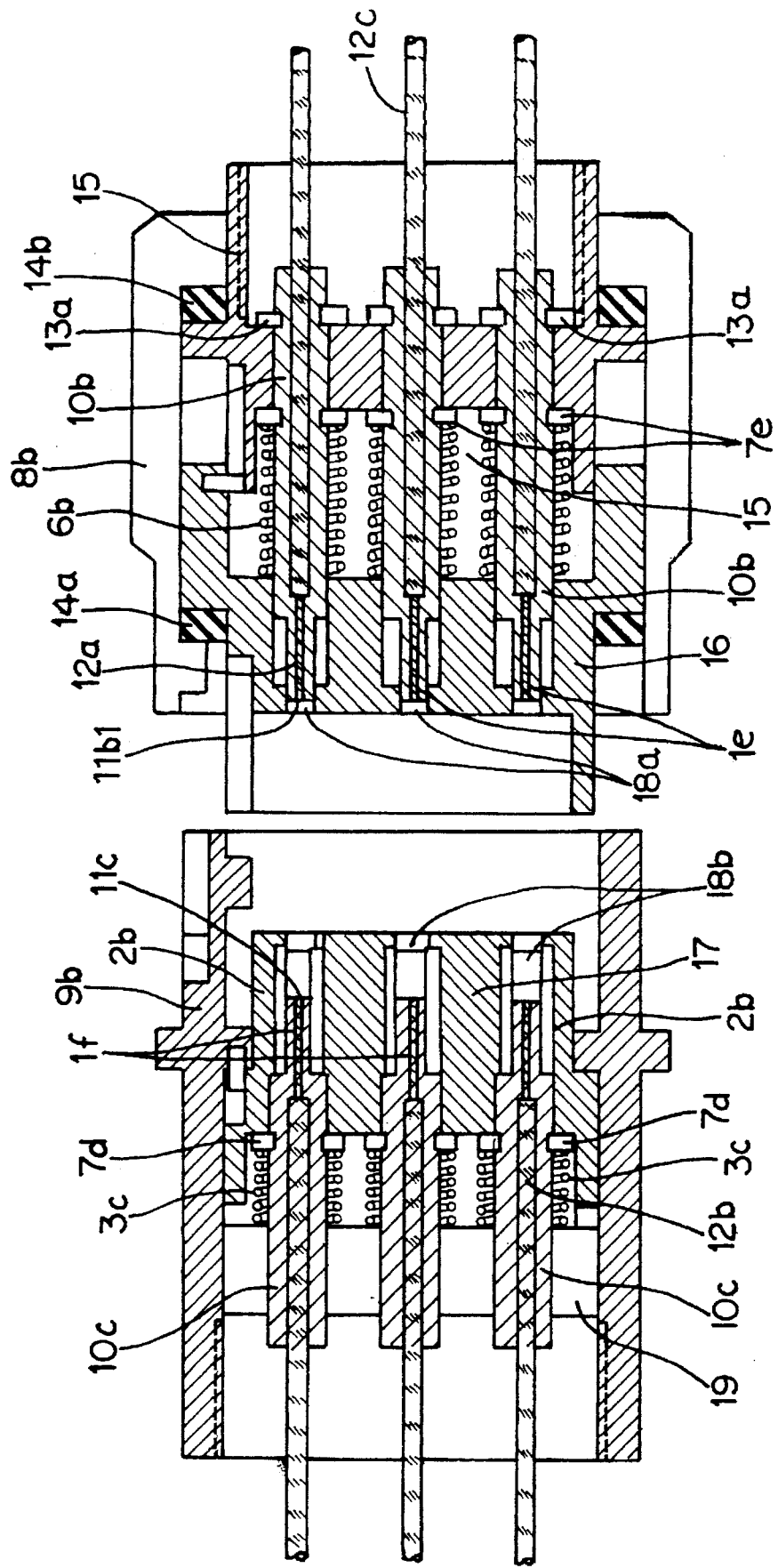
FIG. 3 shows two multipole plugs in the unconnected state.
Figure 4:
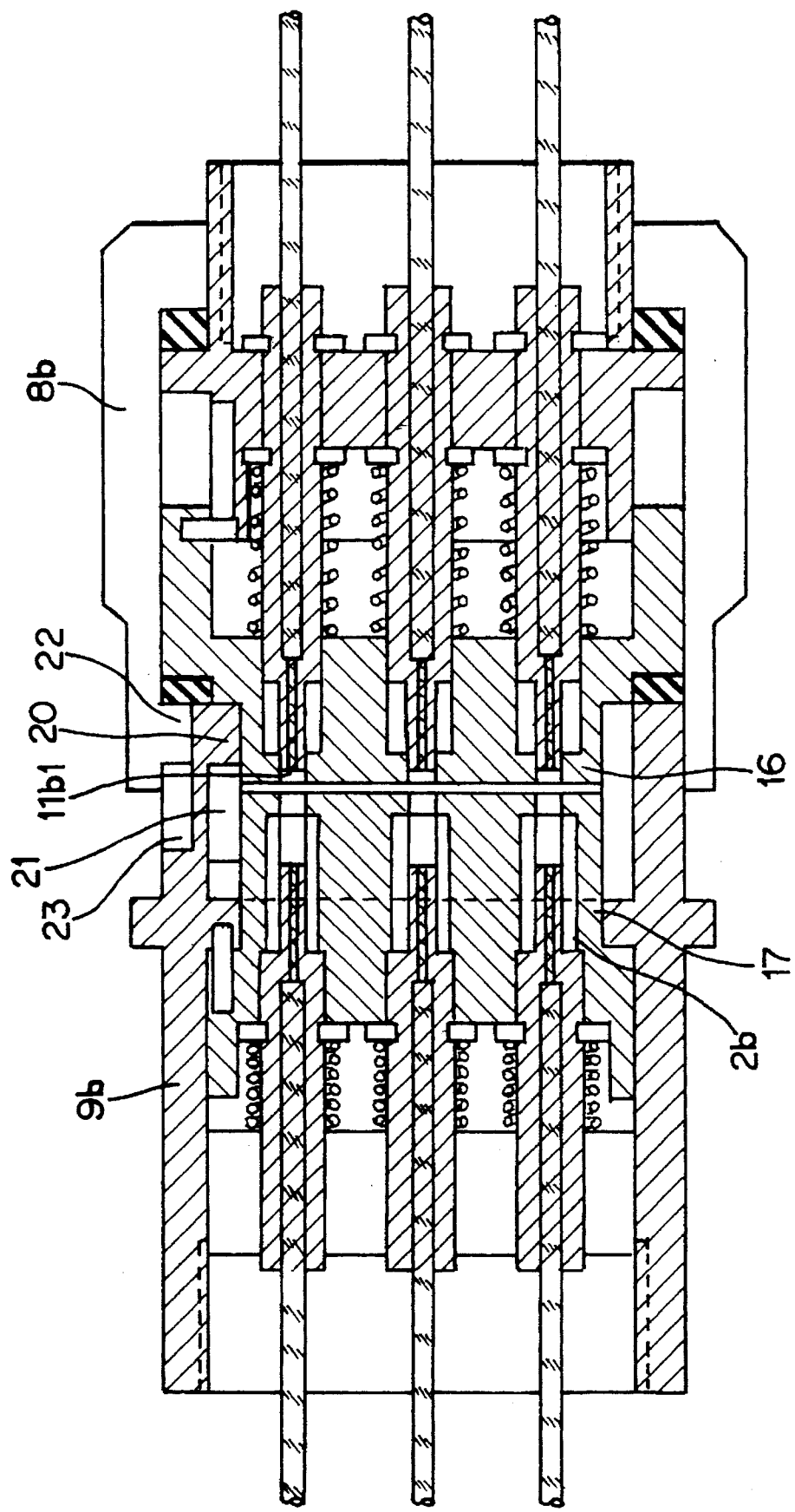
FIG. 4 shows the plugs according to FIG. 3 in the united, still unlocked state
Figure 5:
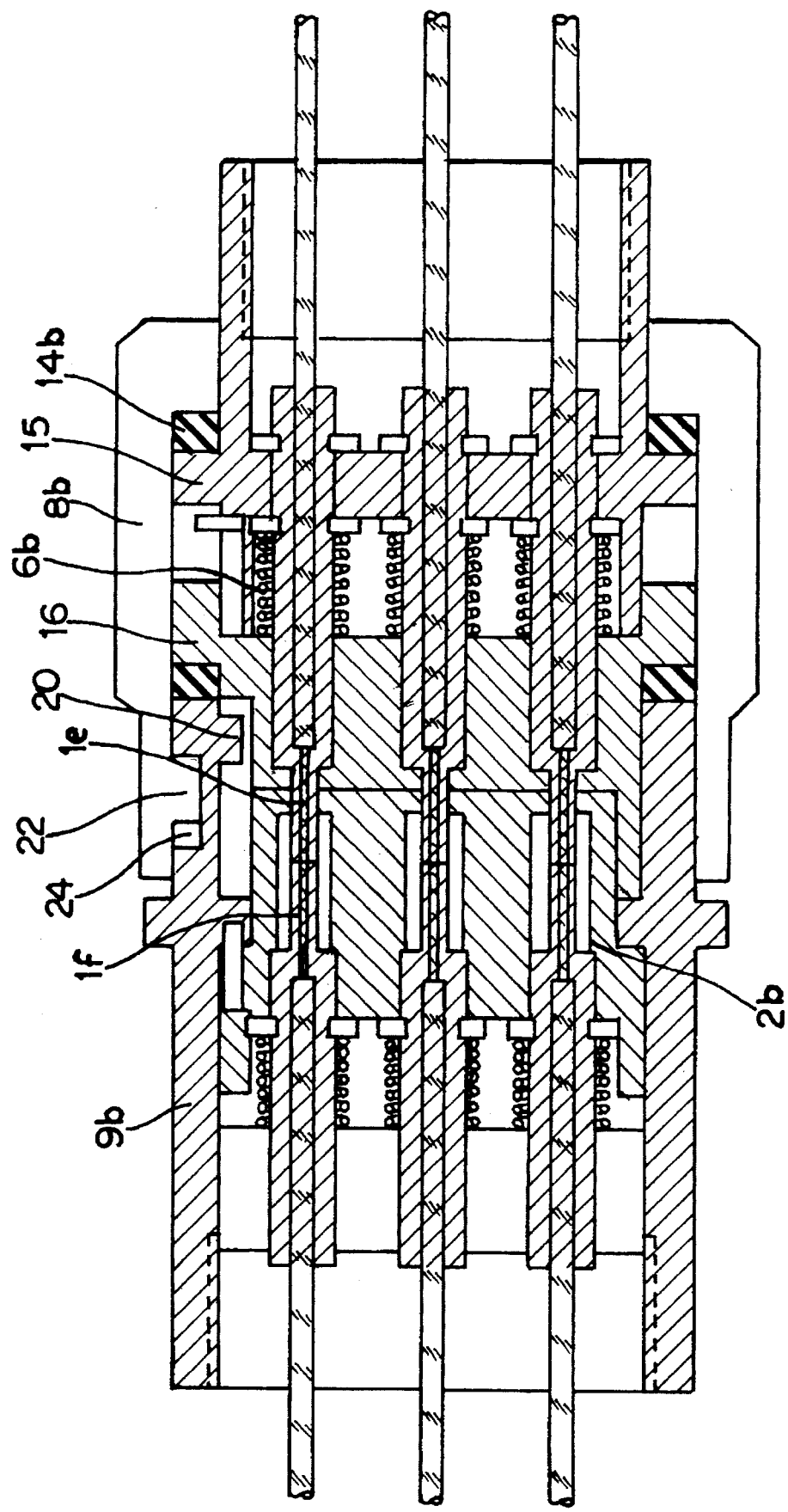
FIG. 5 shows the plugs according to FIGS. 3 and 4 in the locked state.

Multiple plugs according to FIGS. 3 to 5 also have a structure analogous to the plug according to FIG. 2, whereby a bayonet closure sleeve 8b which can be locked with a matching bayonet socket sleeve 8b is provided instead of the lock 8a. The sleeves 8b and 9b simultaneously serve as the plug housing.

The bayonet closure sleeve 8b is sealed against a retaining part 15 by means of sealing ring 14b. The retaining part 15 has holes which receive base elements 10b of the pins 1e. The base elements 10b are held axially nondisplaceably on the retaining part by support rings 7e and driver rings 13a.

Restoring springs 6b which are supported on the support rings 7e or keep pressed the base elements 10b and with them the retaining part 15 and the bayonet closure sleeve 8b in the direction of the optical waveguide 12c (in a direction opposite to the locking direction) are provided concentrically around the base elements 10b. At the other end, the restoring springs 6b are supported on a guide part 16, which in turn is held axially displaceably in the bayonet closure sleeve 8b. The guide part 16 has holes 18a which axially guide the pins 1e. The guide part 16 carries, on a shoulder, a second sealing ring 14a which, on contact with the bayonet socket sleeve 9b, seals said guide part from said socket sleeve, so that, when the plug connection is made, no impurities can enter the space between the pin ends 11b and c.

Figure 1A:
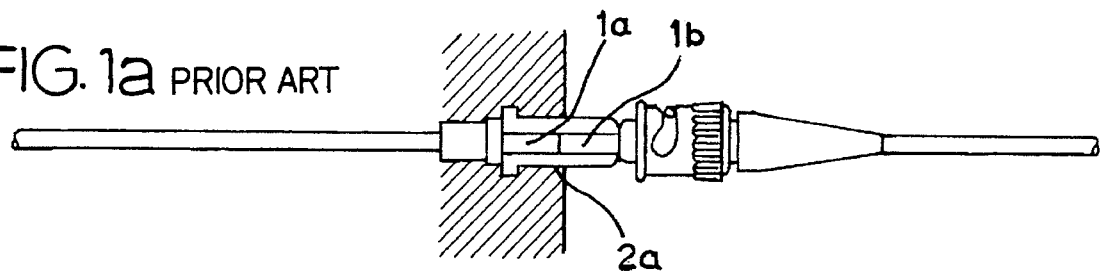
FIGS. 1a–c show different conventional plugs for optical waveguide plug connections.
Figure 1B:
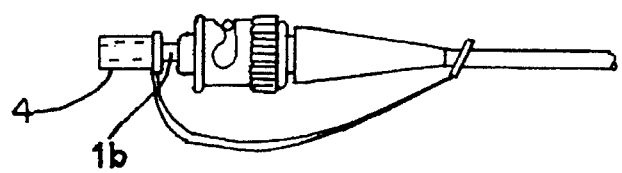
Figure 1C:
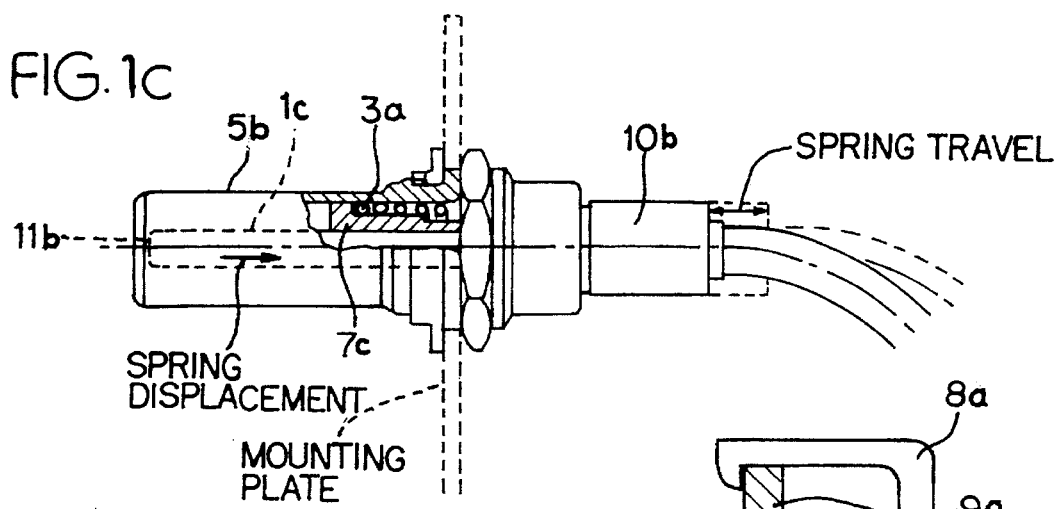

The second plug part in the form of a female connector carries, in its bayonet socket sleeve 9b, an axially displaceable centring part 17 having holes 18b which receive centring sleeves 2b. As in the prior art according to FIG. 1a, the centring sleeves 2b serve for centring two pins 1 inserted against one another—in this case 1e and 1f. The centring part 17 and the centring sleeves 2b centre pins 1f and their base elements 10c, respectively. The base elements 10c carry support rings 7d which are spring-loaded by pressure springs 3c in the insertion direction. The pressure springs 3c are supported against a support part 19 which is nondisplaceably connected to the bayonet socket sleeve 9b and may form one piece therewith. Similarly to the prior art according to FIG. 1c, the purpose of the pressure springs 3c is to press the pins 1f towards the pins 1e, of if, owing to tolerance-related length differences, the pins 1e press too strongly against the pin ends 11c of the pins 1f during insertion or locking of the plug, said pressure springs should permit displacement under spring load.

FIG. 4 shows the position when the two plug parts are loosely united before being locked. It can be seen that the pin ends 11b remain up to the last moment in a protected position 11b1, in which they are protected from any accidental contact in the open state. A guide peg 20 of the bayonet socket sleeve 9b engages an axial guide groove 21 in the guide part 16 in order in this way to achieve the correct positioning of the various pins 1 relative to one another and to prevent rotation. At the same time, catches 22 (only one shown schematically) of the bayonet closure sleeve 8b engage bayonet grooves 23 in the outer surface of the bayonet socket sleeve 9b.

The guide part 16 closes flush with the centring part 17, and the particular pin ends 11 rest against one another.

The next step in the making of the plug connection, namely the locking, is shown in FIG. 5. The bayonet closure sleeve 8b, the retaining part 15, the base element 10b and hence the pins 1e are pushed in the insertion direction against the force of the restoring springs 6b. The pins 1e enter the centring sleeves 2b and are thus brought centrally against the pin ends 11c of the pins 1f. By turning the bayonet closure sleeve 8b, the catches 22 are brought to their locking point 24 in the bayonet socket sleeve 9b, so that they snap in there.

On opening the plug connection in the reverse order, the pins 1e are again withdrawn to the position 11b1 even before the two plug parts can be taken apart.

The invention thus permits an optimally protected plug connection between the ends of optical waveguides, which connection is sealed from the environment. The invention is not restricted by the examples described; thus, variations of the individual parts within the invention are possible within the scope of technical knowledge of an average person skilled in the art. For example, the pressure springs 3c may be dispensed with, or they could be also arranged, for example, in the region of the sealing ring 14b. The restoration positions shown for the pins 1 are not to be understood in quantitative terms. Thus, shorter or longer restoration distances can be chosen for the purposes of the invention.

The cable-side plug ends are not shown or described in detail since conventional end embodiments can be provided for this purpose, as already used, for example, in conventional plug connections between railway cars. Part 17 and part 9b could also be formed as a single part, which has the advantage of requiring fewer movable parts. Part 19 is fastened in part 9b, this not being shown in detail.

I claim:

1. Connector for a plug connection for optical wave guides, comprising:

a first plug part, a second plug part, and a plug housing for said first plug part, wherein at least said first plug part includes a pin in which said optical wave guide is embedded and a spring which subjects said pin to a spring load relative to said plug housing, said spring is a restoring spring that presses said pin in a direction opposite to movement of said first plug part when said first plug part is moved to a connection position with said second plug part, so that said pin moves to a rest position inside said plug housing for said first plug part when said first plug part and said second plug part are in a disconnected position, and said plug housing is of a design such that said pin in said rest position is protected from unintentional contact with a user.

2. Connector according to claim 1, further comprising a pressure spring (3) which has a shorter spring travel than said restoring spring (6), which pressure spring is arranged to apply a spring load to said pin (1) for length compensation between said pin (1) and a second pin in said second plug part, located opposite one another in said connection position.

3. Connector according to claim 1, wherein said restoring spring (6) is in a form of a coil spring and extends concentrically around said pin (1).

4. Connector according to claim 1, wherein said pin (1) is connected to a lock (8b and 22; 8a) for locking said pin (1) in said connection position.

5. Connector according to claim 4, wherein said lock (8a) is locked with a stop (9) which is displaceable against a force of said pressure spring (3b) on said plug housing (5a).

6. Connector according to claim 1, wherein said plug housing is in a form of a bayonet closure sleeve (8b), within which two parts (15, 16) displaceable relative to one another are arranged, each of said two parts (15, 16) are sealed from said sleeve (8b) by sealing rings (14b, a).

7. Connector according to claim 1, wherein said pin (1) has a base element (10), and a support ring (7b; e) which is formed as a single piece with said base element (10).

8. Connector according to claim 1, wherein several of said pins (1) are arranged within a bayonet closure sleeve (8b), a common restoring spring (6) being coordinated with said several pins.

9. Connector according to claim 1, wherein only one of said first and second plug parts has at least one restoring spring (6) for at least one pin (1e), while the other of said first and second plug parts has at least one pressure spring (3), a centring sleeve (2) being coordinated with said other of first and second parts into which centring sleeve an associated pin of said one plug part is inserted in said connection position so that pins (1) opposite to one another come into contact with one another on complete insertion.

10. Connector according to claim 1, wherein said first and second plug parts are lockable together by a bayonet closure system (8b, 9b, 22, 23, 24), one of said first and second plug parts having a guide groove (21), and the other of said first and second plug parts having a guide peg (20) for said guide groove (21) in order to prevent rotation.

11. Connector according to claim 1, wherein said pin (1) has a base element (10) that is non-displaceably held in a retaining part (15), and said restoring spring (6) is supported on said retaining part (15).

12. Connector according to claim 1, wherein several said pins (1) are arranged within a bayonet closure sleeve (8b), and a common pressure spring (3) is coordinated with several of said pins.

13. Connector according to claim 8, wherein a common pressure spring (3) is coordinated with said several of said pins.

* * * * *